Nov. 29, 1955  J. F. STEPHENS  2,724,866
PROCESS OF SHREDDING GLASS FIBERS
FROM A STICK OF GLASS BATCH
Filed May 4, 1953
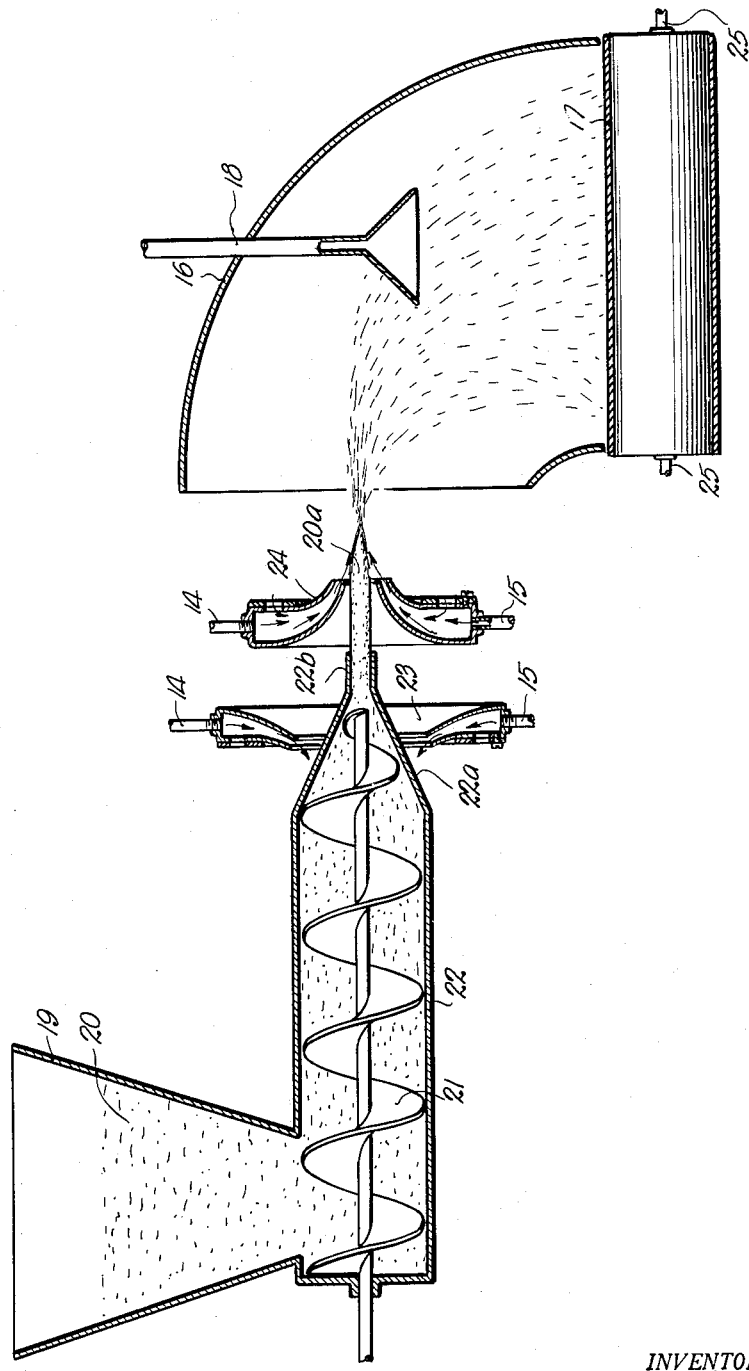
INVENTOR.
Joseph F. Stephens
BY
ATTORNEY.

2,724,866

PROCESS OF SHREDDING GLASS FIBERS FROM A STICK OF GLASS BATCH

Joseph F. Stephens, Kansas City, Mo., assignor to Gustin-Bacon Manufacturing Company, a corporation of Missouri Application May 4, 1953, Serial No. 352,611

2 Claims. (Cl. 18—47.3)

This invention relates to improvements in the production of superfine glass fibers and refers more particularly to a process for shredding, stripping or blasting of fine fibers of glass from an extruded rod or bar of finely ground constituents of glass.

Superfine fibers within the range of from ¾ to 5 microns are being produced by heat blasting the surface of coarse continuous glass filaments fed mechanically into the path of the heated blast. The temperature of the gas blast, its velocity and the time of exposure of the coarse filaments to the gas blast are such as to progressively melt thin outer layers of the filaments which the blast slivers off in the form of superfine diameter glass fibers. The essence of these prior processes lies in the creating of thin molten layers on the surface of the coarse filaments and immediate removal of the heat-softened or melted layer in the form of fiber. The fibers must be stripped from the surface of the molten layers continuously by the blast before the flowable molten layer has a chance to appreciably thicken.

It is also recognized that in this art fine fibers have been produced by melting the tip of a glass rod and progressively advancing the rod into a flame and drawing away from the tip of the rod as melting of the glass occurs a continuous filament by mechanical drawing means such as a drum. Also, glass wool has been produced by shredding a molten stream of glass with steam or other gaseous blasts. In the production of glass wool, a large stream of molten glass is attacked with a gaseous blast, and both coarse and fine fibers accumulate from the operation. These prior methods have their disadvantages which include excessive cost, since coarse filaments must first be produced from fined glass, and excessive amount of fuel is required for the gas blast to act upon small areas of coarse filaments resulting in a relatively low production of fine fiber from the operation and the inevitable production of coarse shot-like particles which are objectionable in the product fiber.

The instant process for making superfine fibers is contrasted with that described in that it relates to the production of superfine fibers by a blasting process in which finely ground constituents of a glass batch, including boron, calcium oxide and silica, form the filament or rod which is blasted instead of molten glass. The glass constituents are preliminarily mixed, and if necessary a binding agent such as water glass (sodium silicate) or the like is added. The ground constituents of the glass batch are preferably compressed within the tube or any suitable container such as an auger or screw conveyor or by an air or hydraulically actuated piston. From the exit end of the tube, which if desired may be gradually reduced in diameter, is fed or extruded a stick or bar of the compressed batch mixture. In the vicinity of the discharged end of the tube and prior to its emergence as a stick or rod, the temperature of the material in the tube is brought up to a desired heat by exteriorly heating the tube or by induction heating. As the stick of batch emerges from the tube, it is subjected to a gaseous blast sufficiently hot to melt a thin outer layer of the stick and shred from the molten exterior layer superfine fibers in a manner similar to the blasting of glass fibers from glass rods or filaments as is done in commercial practice at the present time.

The particular advantage in the instant process resides primarily in eliminating the necessity of a preliminary melt of glass, the fining of the glass, the production of coarse rods or filaments of glass, since by this procedure the production of fine fibers is accomplished directly from a compressed rod or stick of glass batch constituents.

It may or may not be necessary to add an auxiliary force to propel the stick of batch after extrusion from the auger, piston or tube, but normally the same force which compresses the batch into the stick can also be utilized to feed the stick into the path of the gas blast.

Among the objects of the invention here contemplated is the elimination of the step of producing coarse glass filaments required in the conventional production of fine glass fibers.

Another object is to eliminate the usual preliminary steps of fining a glass body from a batch of glass constituents and drawing or molding the molten glass into a rod or molten stream before fiber production.

Other and further objects will appear from the description that follows. The single figure shows diagrammatically an apparatus in which the process may be practiced.

In the apparatus shown in the drawing, the mineral ingredients essential to the glass batch are supplied from any convenient source not shown to a hopper 19 in proportioned amounts to make up the proper constituency for the glass fiber to be produced. A binder such as water glass (sodium silicate) may be added to the batch if necessary to supply an adhesive to the batch and unite the particles sufficiently to form a self-sustaining rod or stick when extruded from the vessel or container in which they are mixed. The mixture 20 is fed from the hopper by screw conveyor 21 through a conveyor tube 22 into its tapered end 22a. A section of the tapered portion or a selected area of the conveyor tube is preferably heated by a burner or plurality of burners 23 supplied with fuel through pipe 14 and air through pipe 15. Heating of the glass batch may be accomplished either by a burner or combustion nozzle as shown or by induction heating to put the slowly moving batch in condition for subsequent gas blasting when the fibers are actually produced from the stick of batch. In the preliminary heating operation, the binder material is dispersed uniformly throughout the batch as it is extruded in the form of a stick from the restricted end 22b of the tube and serves to unite the ground ingredients into solid form.

Surrounding the stick of batch as it is extruded from the tube are combustion gas nozzles 24 supplied with fuel through pipe 14 and air through pipe 15 located to produce a blast of combustion gases against the outer periphery of the stick or rod of batch as it is extruded from the tube. The temperature of this gas blast is such as to melt a thin layer on the outer surface of the stick to convert the same into glass and the jet or blast is directed to simultaneously shred or tear from the melted layer superfine fibers in a manner similar to the blasting of fine fibers from coarse glass filaments previously described. The temperature and velocity of the gas blast are such that the shredding or slivering of fine fibers from the end of the stick of batch completely consumes the stick.

The fibers produced are discharged into the open end of hood 16. The bottom or floor of the hood is a traveling belt 17 supported by cylindrical rollers, one of which is shown mounted upon a shaft 25. A binder is supplied to the fibers as they enter the hood through pipe 18 being intimately mixed with the fibers as they are deposited in the form of a mat on the traveling support 17. To compact the mat on the traveling support vacuum may be imposed beneath the belt and suction drawn upon the mat to compress the fibers as they are accumulated. The details of the apparatus for forming the mat are conventional and may be altered or changed according to the requirements of the particular mat being produced.

In performing the process of producing superfine fibers by this method, instead of preliminarily producing a melt or molten body of glass as has been done previously in this art, the constituents of the glass or the materials which constitute the raw stock for the melt are finely ground, and supplied into hopper 19 with the binder material. This glass batch in granular form is mixed and advanced by the conveyor screw or auger along horizontal tube 22 into the tapered end of the tube. Heat is supplied to bring the batch to a temperature necessary to put the batch in condition that it will form a relatively stiff hard stick or rod when extruded from the tube. Surrounding the extruded rod is a burner or series of burners through which the gas blast is directed onto the end of the stick or rod of batch. This gas blast must have sufficient heat and velocity to melt the outer layer of the stick of batch to shred it into fine fibers as the stick is discharged from the tube.

It is contemplated that a plurality of these fiber-forming tubes will be positioned in the front of an elongated hood to produce sufficient fine fibers and build up a mat of adequate thickness at a rapid rate.

Thus, it will be seen that there has been provided a process by which the operations for producing fine fibers has been reduced to a minimum. There has been eliminated the necessity of maintaining a glass body and preliminarily producing coarse filaments or rods from which the fibers are blasted. Not only has the fining of a glass body been avoided but the drawing mechanism for removing the filaments has been done away with and there remains the simple operation of supplying the constituents of the glass to a tube reducing the ingredients to a stick of batch and blasting the formed stick or rod by a hot jet or jets of combustion gases to melt the surface of the stick and blast or shred therefrom superfine fibers.

From the foregoing, it will be seen that the invention is well adapted to attain the ends and objects herein set forth, together with other advantages which are obvious and inherent to the process. As many possible embodiments may be made of the invention without departing from the scope thereof, it is understood that all matter herein set forth or shown in the drawings is to be interpreted as illustrative and not in a limiting sense.

Having thus described my invention, I claim:

1. A process for the production of fine glass fibers comprising feeding the ingredients of a glass batch in proportioned amounts into a mixing zone where they are intimately combined, compressing the glass batch mixture into a stick of batch and blasting the periphery of the stick of batch with a highly heated gas stream at high velocity to convert the batch into glass and simultaneously shred fine glass fibers therefrom.

2. A process as in claim 1, including adding a binder to the batch prior to forming the stick of batch.

References Cited in the file of this patent

UNITED STATES PATENTS

| | | |
|---|---|---|
| 2,206,058 | Slayter et al. | July 2, 1940 |
| 2,313,296 | Lamesch | Mar. 9, 1943 |
| 2,450,363 | Slayter et al. | Sept. 28, 1948 |
| 2,566,252 | Tooley et al. | Aug. 28, 1951 |
| 2,585,496 | Powell | Feb. 12, 1952 |

FOREIGN PATENTS

| | | |
|---|---|---|
| 610,845 | Great Britain | Oct. 21, 1948 |